US008085341B2

(12) United States Patent
Taneoka

(10) Patent No.: US 8,085,341 B2
(45) Date of Patent: Dec. 27, 2011

(54) DIGITAL CAMERA INCLUDING REMAINING BATTERY VOLTAGE CHECK

(75) Inventor: Kazuhito Taneoka, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 491 days.

(21) Appl. No.: 11/836,979

(22) Filed: Aug. 10, 2007

(65) Prior Publication Data

US 2008/0036904 A1 Feb. 14, 2008

(30) Foreign Application Priority Data

Aug. 11, 2006 (JP) ................................. 2006-219285

(51) Int. Cl.
*G03B 7/26* (2006.01)
(52) U.S. Cl. ........ 348/372; 396/277; 396/279; 396/301; 396/302
(58) Field of Classification Search .................. 348/372, 348/333.04; 396/201, 203, 279, 277
See application file for complete search history.

(56) References Cited

U.S. PATENT DOCUMENTS

| 4,866,471 | A | * | 9/1989 | Ikuta | 396/279 |
| 5,528,335 | A | * | 6/1996 | Terunuma | 396/279 |
| 6,351,611 | B1 | * | 2/2002 | Nonaka | 396/203 |
| 7,542,092 | B2 | * | 6/2009 | Ohsawa | 348/372 |
| 2001/0008424 | A1 | * | 7/2001 | Higuchi et al. | 348/372 |
| 2001/0030691 | A1 | * | 10/2001 | Higuchi et al. | 348/207 |
| 2002/0018137 | A1 | * | 2/2002 | Tsuda | 348/333.02 |
| 2002/0025160 | A1 | * | 2/2002 | Shimada et al. | 396/277 |
| 2002/0075397 | A1 | * | 6/2002 | Hanada et al. | 348/372 |
| 2004/0215408 | A1 | * | 10/2004 | Lamer et al. | 702/63 |
| 2005/0013604 | A1 | * | 1/2005 | Ogawa | 396/279 |
| 2005/0254811 | A1 |   | 11/2005 | Taneoka |   |
| 2006/0291848 | A1 | * | 12/2006 | Takahashi et al. | 396/279 |

FOREIGN PATENT DOCUMENTS

| JP | 2003189165 | 7/2003 |
| JP | 20063501 | 1/2006 |

OTHER PUBLICATIONS

English language Abstract of JP 2003-189165.
English language Abstract of JP 2006-3501.

* cited by examiner

*Primary Examiner* — David Ometz
*Assistant Examiner* — Dwight C Tejano
(74) *Attorney, Agent, or Firm* — Greenblum & Bernstein, P.L.C.

(57) ABSTRACT

A digital camera has a battery that supplies electric power, a battery level detector, a time detector, a remaining voltage calculator, and a boot controller. When the digital camera is turned off, the battery level detector detects a remaining voltage level of the battery. When the digital camera is turned on, the time detector detects an elapsed time from the last electric power OFF operation to the current electric power ON operation, namely, a time period in which the camera is in the OFF state. Further, when the digital camera is turned on, the remaining voltage calculator calculates a remaining voltage-level of the battery on the basis of the detected elapsed time, the last detected remaining voltage level, and the discharge characteristic of the battery. Then, the boot controller allows the digital camera to boot if the calculated remaining voltage level is larger than a limited voltage necessary to boot the digital camera.

20 Claims, 7 Drawing Sheets

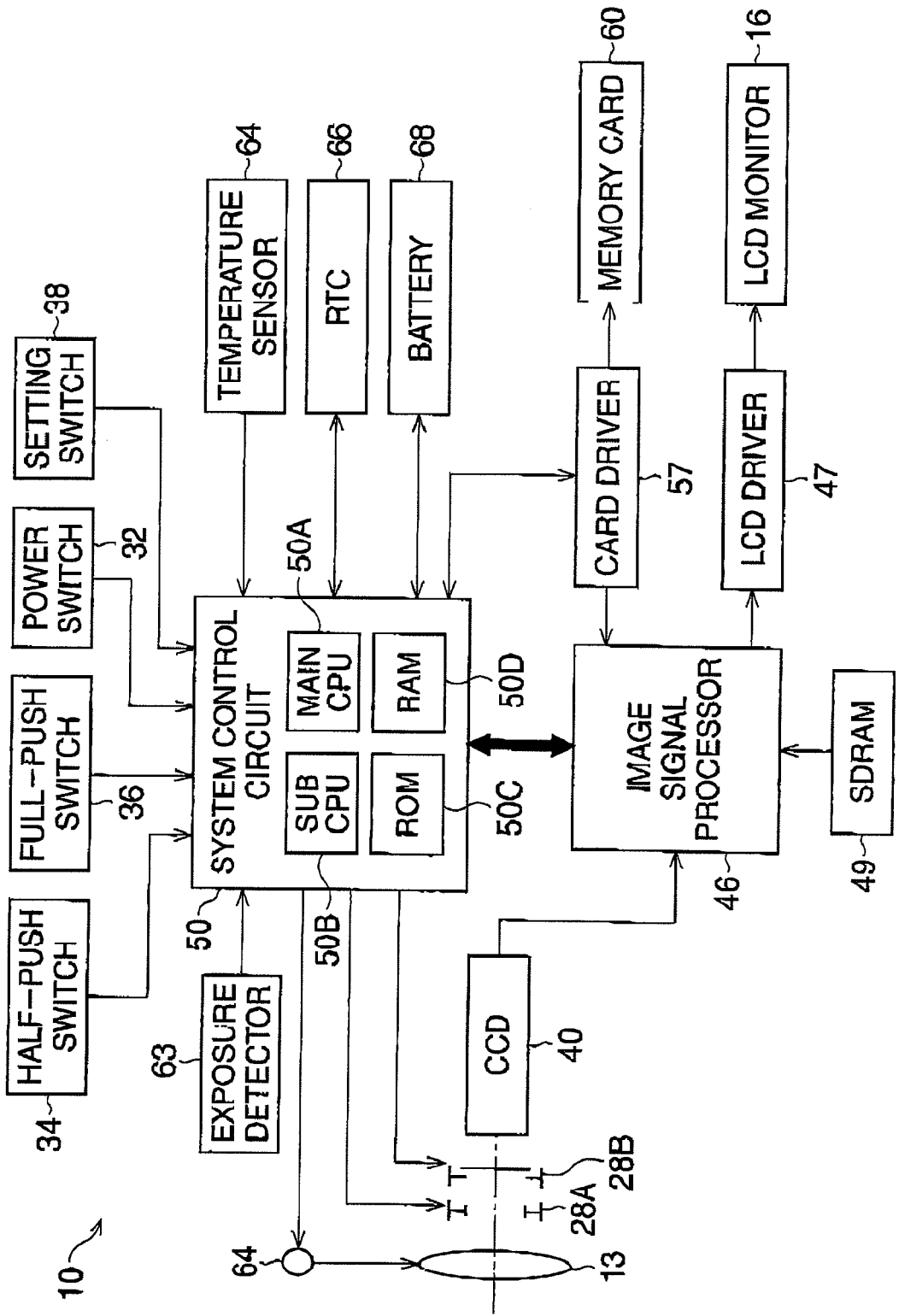

DIGITAL CAMERA INCLUDING REMAINING BATTERY VOLTAGE CHECK

BACKGROUND OF THE INVENTION

1. Field of the Invention

The present invention relates to mobile electronic equipment with a photographing function, such as a digital camera, a cellular phone, and soon. In particular, it relates to a battery check after electric power is supplied to the unit.

2. Description of the Related Art

In a digital camera, when electric power is supplied by the operation of a power button, a program is read from a memory such as a ROM. Then, a boot or startup process, which includes an initial driving of the imaging system and an acquirement of information stored in a removably attached memory card, is carried out. After that, the camera is ready to carry out an imaging operation of a subject. The imaging system, including an image sensor and a photographing optical system and circuits, should be actuated to an initial setting immediately after the electric power is turned on. Therefore, to confirm whether the camera can boot up, a check process to check the remaining battery level; namely, the remaining voltage level, is carried out when the electric power is turned on.

To allow the camera to shoot as soon as possible after the electric power is turned on, for example, firstly only a program necessary to boot up the imaging system is read from the memory, and then a program necessary for other processes is read. However, since the battery check involves a process that inputs or applies a voltage to a suitable load such as a motor, the total boot time taken to prepare the camera for an imaging operation becomes relatively long. On the other hand, to prevent from the camera stopping while the imaging system is being set to the initial setting, it is necessary to check the battery level at the time that the electric power is turned on.

SUMMARY OF THE INVENTION

An object of the present invention is to provide a digital camera, an apparatus, a computer readable medium that stores a program, or a method that is capable of rapidly booting after electric power is supplied.

A digital camera according to the present invention has a battery that supplies electric power, a battery level detector, a time detector, a remaining voltage calculator, and a boot controller. When the digital camera is turned off, a battery level detector detects a remaining voltage level of the battery. When the digital camera is turned on, the time detector detects the elapsed time from the last electric power OFF operation to the current electric power ON operation, namely, the period during which the power of camera is OFF. Further, when the digital camera is turned on, the remaining voltage calculator calculates a remaining voltage level of the battery on the basis of the detected elapsed time, the detected remaining voltage level, and the discharge characteristic of the battery. Then, the boot controller allows the digital camera to boot if the calculated remaining voltage level is larger than the limited voltage necessary to boot the digital camera.

An apparatus for starting up mobile electronic equipment with a photographing function, according to another aspect of the present invention, has a battery level detector that detects a remaining voltage level of the battery when the mobile electronic equipment is turned off, a time detector that detects the elapsed time from the last electric power OFF operation to the current electric power ON operation when the mobile electronic equipment is turned on; a remaining voltage calculator that calculates the remaining voltage-level of a battery provided in the mobile electronic equipment on the basis of the detected elapsed time, the detected remaining voltage level, and the discharge characteristic of the battery when the mobile electronic equipment is turned on; and a boot controller that allows the mobile electronic equipment to boot if the calculated remaining voltage level is larger than the limited voltage necessary to boot the mobile electronic equipment.

A computer readable medium that stores a program for starting up mobile electronic equipment, according to another aspect of the present invention, has a battery level detection code segment that detects a remaining voltage level of the battery when the mobile electronic equipment is turned off; a time detection code segment that detects the elapsed time from the last electric power OFF operation to the current electric power ON operation when the mobile electronic equipment is turned on; a remaining voltage calculation coda segment that calculates the remaining voltage level of a battery provided in the mobile electronic equipment on the basis of the detected elapsed time and the discharge characteristic of the battery, when the mobile electronic equipment is turned on; and a boot control code segment that allows the mobile electronic equipment to boot if the calculated remaining voltage level is larger than a limited voltage necessary to boot the mobile electronic equipment.

A method for starting up mobile electronic equipment with a photographing function, according to another aspect of the present invention, includes a) detecting the elapsed time from the last electric power OFF operation to the current electric power ON operation, when the mobile electronic equipment is turned on; b) calculating the remaining voltage level of a battery provided in the mobile electronic equipment on the basis of the detected elapsed time, a last remaining voltage level that was detected when the mobile equipment was turned off, and the discharge characteristic of the battery, when the mobile electronic equipment is turned on; and a) allowing the mobile electronic equipment to boot if the calculated remaining voltage level is larger than a limited voltage necessary to boot the mobile electronic equipment.

BRIEF DESCRIPTION OF THE DRAWINGS

The present invention will be better understood from the description of the preferred embodiments of the invention set forth below together with the accompanying drawings, in which:

FIG. 2 is a block diagram of the digital camera;

DESCRIPTION OF THE PREFERRED EMBODIMENTS

Hereinafter, the preferred embodiment of the present invention is described with reference to the attached drawings.

Figure 1:
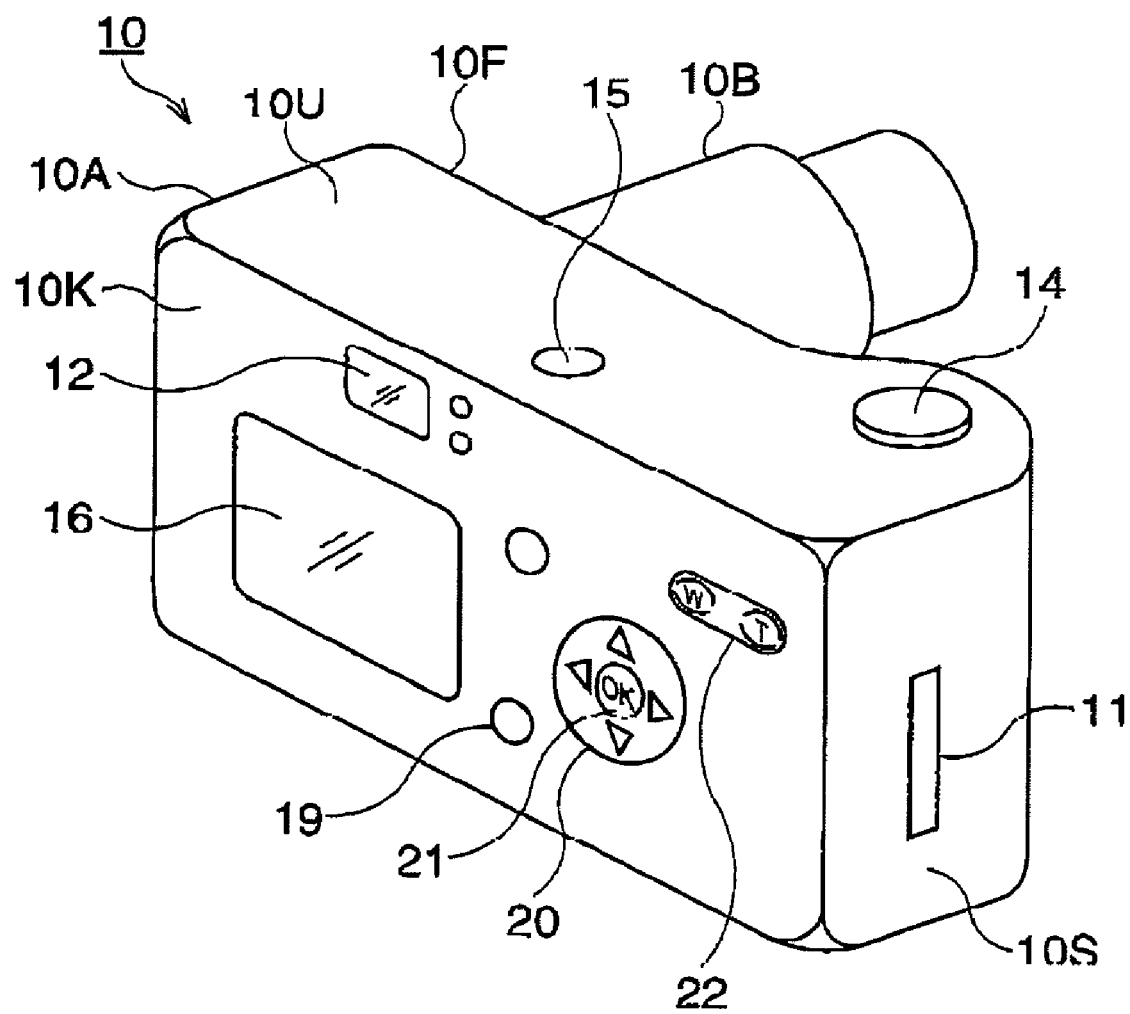
FIG. 1 is a perspective view of a digital camera according to the present embodiment.

FIG. 1 is a perspective view of a digital camera according to the present embodiment.

The compact type digital camera 10 in equipped with a body 10A and a lens barrel 10B, attached to the front surface 10F of the body 10A. The lens barrel 10B extends outwards from the front surface 10F while the digital camera is switched on. A release button 14 and a power button is are provided on the upper surface 10U, whereas a view finder 12, an LCD monitor 16, a return button 19, a cross-shaped four-way controller 20, an OK button 21, and a zoom lever 22 are provided on the back surface 10K. Further, a card slot 11 is provided on the side surface 10S and a flash light (not shown) is provided on the front surface 10F.

The four way controller 20 and the OK button 21 are operated when selecting one of; a menu mode, a photographing mode, or a playback mode, and further, when setting a specific photographing mode and changing the photographing condition. When the digital camera is turned on by depressing the power button 15, an initial startup process or boot process is carried out, as described later. Subsequently, the photographing optical system (not shown herein), which is accommodated inside the body 10A during the electric power OFF state, extends in a forward direction along with the lens barrel 10B.

FIG. 2 is a block diagram of the digital camera 10. A system control circuit 50, including a main CPU 50A, a sub CPU 50B, a ROM 50C, and a RAM SOD, controls the camera motion or processes performed in the digital camera 10, and a program for controlling the camera 10 is stored in the ROM 50C. The main CPU 50A controls the camera 10 while the main electric power is supplied, namely, the camera is in the ON state. On the other hand, the sub CPU 50R controls the camera in while the main electric power is not supplied.

A main switch 32, a half-push switch 34, a full-push switch 36, and a setting switch 38 are connected to the system control circuit 50. When the power switch is turned on by depressing the power button 15, the main electric power is supplied to each circuit. The half-push switch 34 and the full-push switch 36 detect a half-push and a full-push of the release button 14, respectively. The setting switch 38 detects an operation of the four-way controller 20 and the OK button 21.

When the photographing mode is selected, a signal process for displaying a moving image is performed. Light from a photographing subject passes through the photographing optical system 13, an iris 28A, and a shutter 28B, so that a subject image is formed on the light-receiving surface of the CCD 40. Consequently, analog image-pixel signals corresponding to the subject image are generated in the CCD 40. The generated image-pixel signals are successively read from the CCD 40 by a CCD driver (not shown) at given constant intervals (for example, 1/60 second intervals). In this embodiment, an on-chip color filter method using one color filter is used.

The read image-pixel signals are amplified in an amplifier (not shown), and are converted to digital image signals in an A/D converter (not shown). The digital image signals are input to an image signal processor 46, in which various processes, such as a white balance and a gamma correcting process, are performed on the digital image signals. The processed image signals are temporarily stored in a frame memory (not shown), and are fed to an LCD driver 47. The LCD driver 47 drives the LCD monitor 16 on the basis of the image signals, so that a moving-image is displayed on the LCD monitor 16. The image signal processor 46, constructed of a DSP (digital signal processor), is connected to an SDRAM 49.

When the release button 15 is depressed halfway, the brightness of the subject is detected by an exposure detector 63, and auto-focusing is performed by driving a focusing lens included in the photographing optical system 13. The focusing lens is driven by a lens driver (not shown) such that the image-forming surface coincides with the light-receiving surface of the CCD 40. Further, when the release button 14 is depressed fully, an image-capturing process for recording a still image is carried out. The iris 28A and shutter 28B opens by given amount, thus, one frame's worth of image-pixel signals corresponding to a still image are generated in the CCD 40. An exposure controller (not shown) controls the iris 28A and the shutter 28B.

The generated image-pixel signals are read from the CCD 46, and are subjected to processes in the amplifier, the A/D converter, and the image signal processor 40. Then, the image data temporarily stored in the frame memory is compressed in the image signal processor 40, and the compressed image data is stored into the memory card 60 via a card driver 57. Data is transmitted between the card driver 57 and the memory card 60, and the card driver 57 transmits data such as information associated with the total capacity, unused capacity, and available address area of the memory card 60, to the system control circuit 50.

When the playback mode is selected, the compressed image data selected by a user is read from the memory card 60. Then, the image data is subjected to an expanding process in the image signal processor 46. The expanded and reconstructed image data is temporarily stored in the frame memory, and the LCD driver 47 drives the LCD monitor 16 on the basis of the image data. Thus, a selected still image is displayed on the LCD monitor 16.

A battery 68 supplies electric power to various circuits, including the system control circuit 50. The system control circuit 50 is capable of detecting the remaining voltage level of the battery 60 on the basis of the value or the voltage that is output from the battery 68 to the system control circuit 50. A temperature sensor 64 detects the temperature in the environment or condition where the camera 10 is operated. An RTC (Real Time Clock) 66 measures in real time. While the camera 10 is in the OFF state, the main CPU 50A does not function, and is set to a sleep mode. On the other hand, the sub CPU 50B functions while the camera 10 is in the OFF state, and electric power for backup is supplied to the sub CPU 50B, the RAM 50D, and the RTC 66 by the battery 68. Thus, the sub CPU SOB, the RAM SOD, and the RTC 66 can still function while the camera 10 is in the OFF state.

Figure 3A:
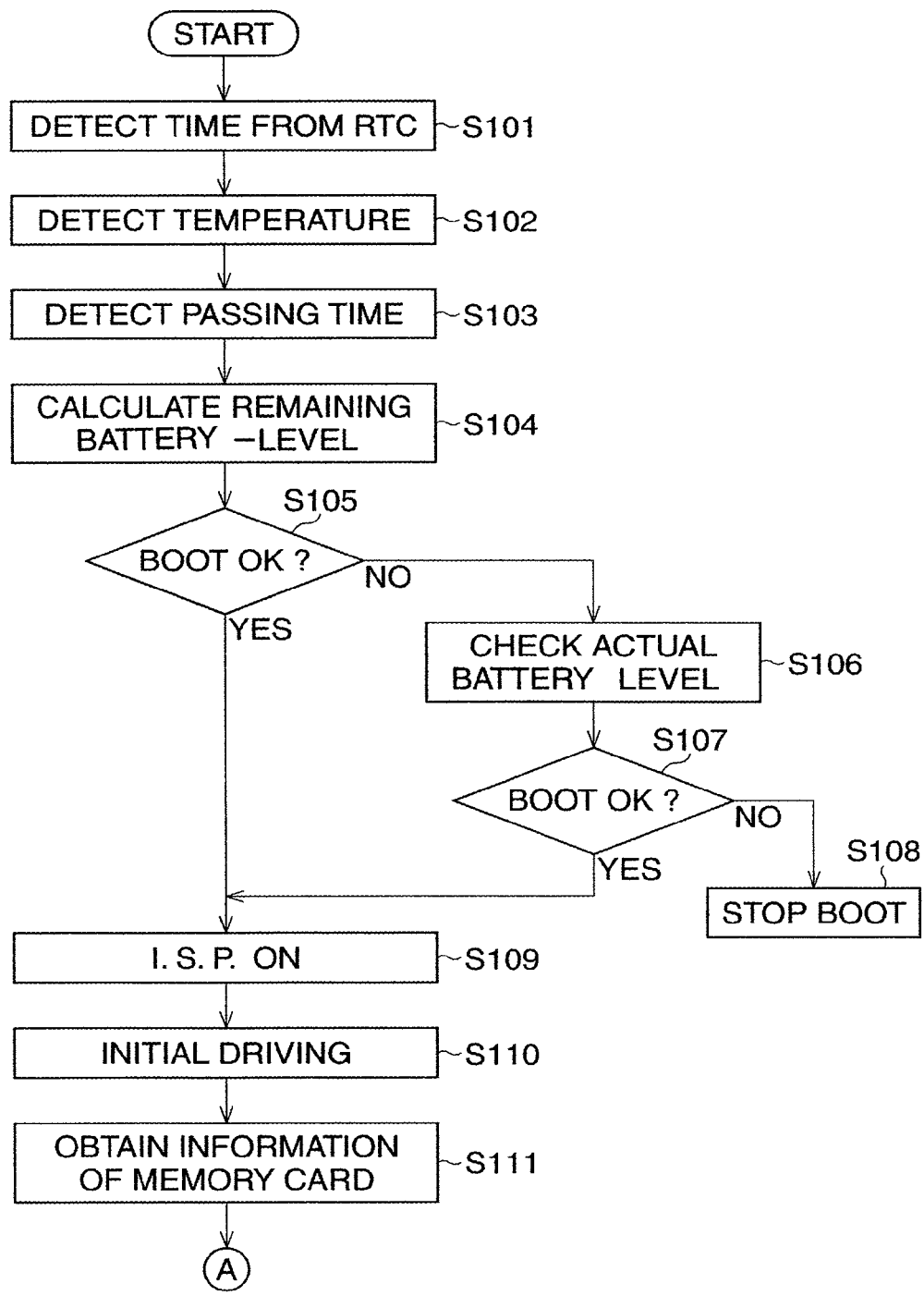
FIGS. 3A and 3B are flowcharts showing the camera control process performed by the main CPU.
Figure 3B:
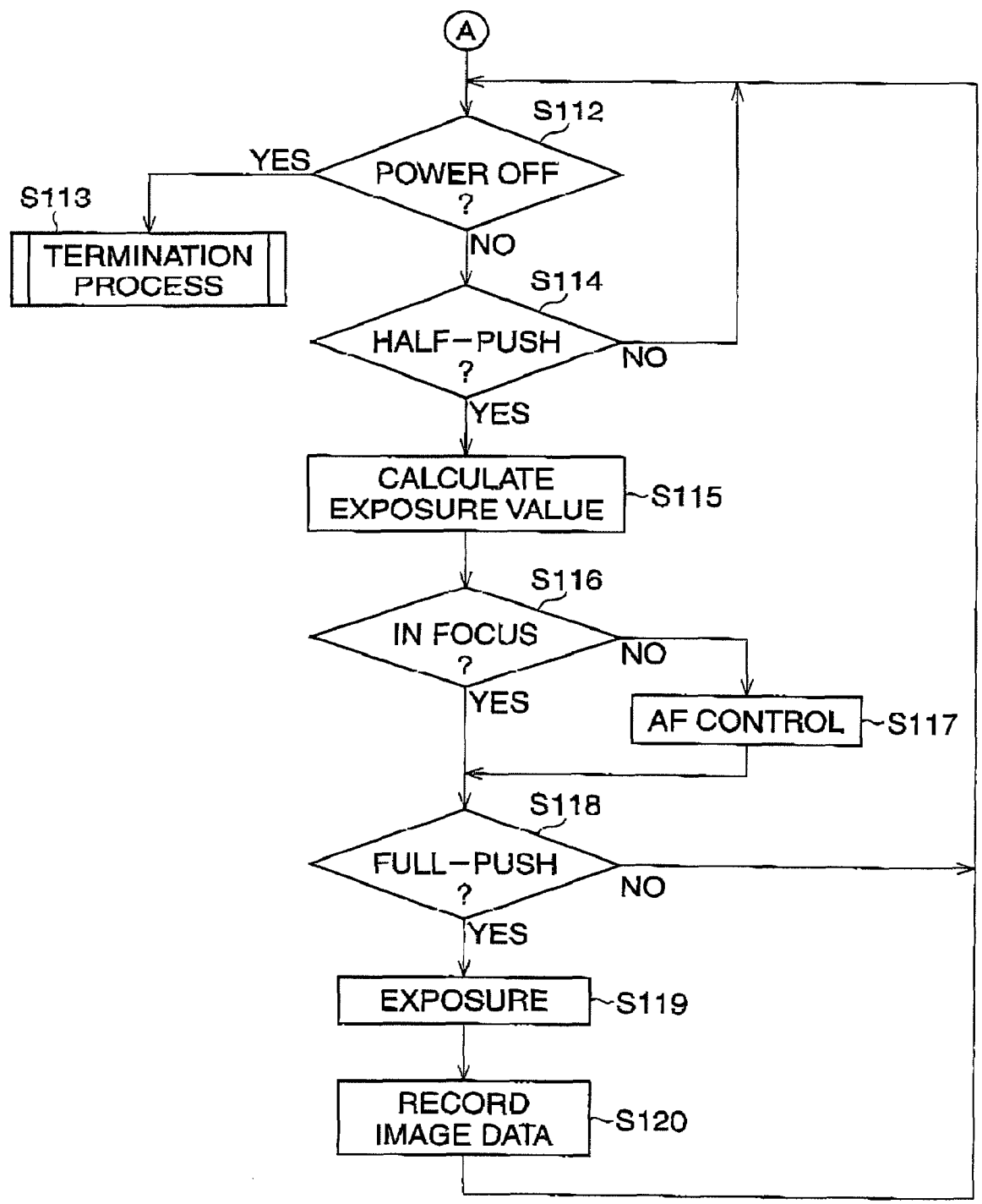
Figure 4:
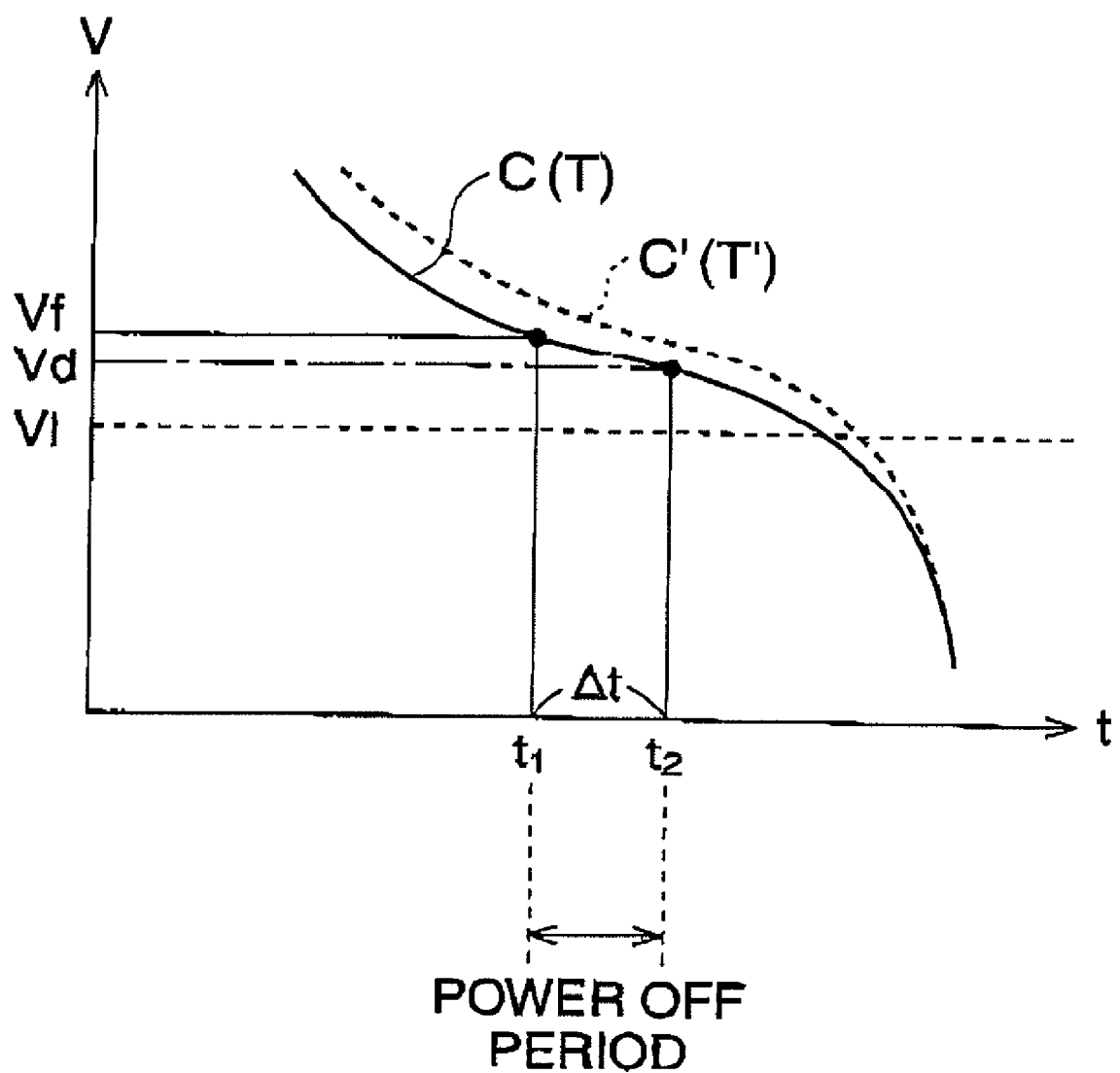
FIG. 4 is a graph representing the discharge characteristic of a battery.

FIGS. 3A and 3B are flowcharts showing the camera control process performed by the main CPU 50A. FIG. 4 is a graph showing the discharge characteristic of the battery 68. The process (main routine) is started when the camera 10 is turned on by depressing the power button 15.

In Step S101, the present time is detected by the RTC 66. In Step S102, the temperature in the camera 10 is detected by the temperature sensor 64. In Step S103, the elapsed time from the last electric power OFF operation to the current electric power ON operation, namely, the time during which the camera was in the OFF state is calculated. The elapsed time is calculated on the basis of the time detected when the electric power was last turned off and the time detected at Step Slot. Note that, the time detected when the electric power was last turned off is stored in the RAM 50D. Then, in Step S104, based on the discharge characteristic of the battery 68, the calculated elapsed time, and the voltage level that was actually detected when the camera was last turned Off; the present remaining battery level, namely, the present remaining voltage level, is calculated (hereinafter called the "estimated remaining voltage level).

Generally, the discharge characteristic of a normal battery is represented by a curved line as shown in FIG. 4. The voltage level gradually decreases with time "t", and then abruptly decreases when the end of the battery life approaches. Further, the discharge curve varies with temperature. Herein, a discharge curve "C", which corresponds to a temperature "T" of an environment or condition in which the camera 10 is operated, is shown, and a discharge curve "C'" corresponding to a temperature "T' (≠T)" is also shown. Data associated with the discharge curve for each temperature is stored in the ROM 50 in advance. With reference to FIG. 4, in Step S104, based on the actually detected voltage value "Vf" when the camera 10 is turned on, the elapsed time "Δt (=$t_2$−$t_1$)", and the detected temperature "T", the estimated remaining voltage value "Vd" in the situation in which the camera was turned on, is calculated. Namely, the remaining voltage value when the camera is turned on is predicted.

In Step S105, it is determined whether the calculated estimated remaining voltage level is larger than the limited voltage level "V1". The limited voltage value "V1" shown in FIG. 4 represents the voltage level necessary to allow the camera 10 to photograph a subject. Heroin, the initial boot process includes an initial driving of the CCD 40, a shifting motion of the photographing optical system 13, an open/close motion of the shutter 28B, a boot process of the image signal processor 46, an initial driving of the LCD monitor 16, and a process for detecting the information associated with the memory card 60. If it is determined that the estimated remaining voltage level is larger than the limited voltage-level "V1", the process moves to Step S109.

On the other hand, if it is determined, at Step S105, that the estimated remaining voltage value is not larger than the limited voltage value "V1", of the process moves to Step S106, in which the voltage level of the battery 56 is detected by the system control circuit 50. Then, in Step S107, it is determined whether the detected remaining voltage value is larger than the limited voltage level "V1". If it is determined that the detected actual remaining voltage level is not larger than the limited voltage level "V1", the process moves to Step S108, in which the boot process is aborted. On the other hand, if it is determined that the detected actual remaining voltage level is larger than the limited voltage level "V1", the process moves to Step S109.

In Step S109, the image signal processor 46 boots or startup. In Step S110, the photographing optical system 13, the shutter 28B, the CCD 40, the LCD monitor 16, and so on are subjected to an initial driving. Then, in Step S111, data, which includes information such as the capacity and available address area for storing data of the memory card 60, is sent from the card driver 57 to the system control circuit 50. After Step S111 is carried out, the process moves to Step S112 shown in FIG. 3B.

In Step S112, it is determined whether the camera 10 is turned off through depressing the power button 15. If it is determined that the camera 10 is turned off, the process moves to Step S113, in which a terminating process described later is carried out. On the other hand, if it is determined that the camera 10 is not turned off, the process moves to Step S114.

In Step S114, it is determined whether the release button 14 is depressed halfway. If it is determined that the release button 14 is not depressed halfway, the process returns to Step S112. On the other hand, if it is determined that the release button 14 is depressed halfway, the process moves to Step S115, in which exposure values, namely, the shutter speed and F-number are calculated. In Step S116, it is determined whether the subject image is in focus. If it is determined that the subject image is not in focus, the process moves to Step S117, in which the auto focusing process is carried out. On the other hand, if it is determined that the subject image is in focus, the process moves to Step S118.

In Step S118, it is determined whether the release button 14 is fully depressed. If it is determined that the release button 14 is not fully depressed, the process returns to Step S112. On the other hand, if it is determined that the release button 14 is fully depressed, the process moves to Step S19, in which the iris 28A and the shutter 28B movements, and the exposure process, are carried out. Then, in Step S120, a recording process for recording a still image in the memory card 60 is carried out. After Step S120 is carried out, the process returns to Step S112.

Figure 5:
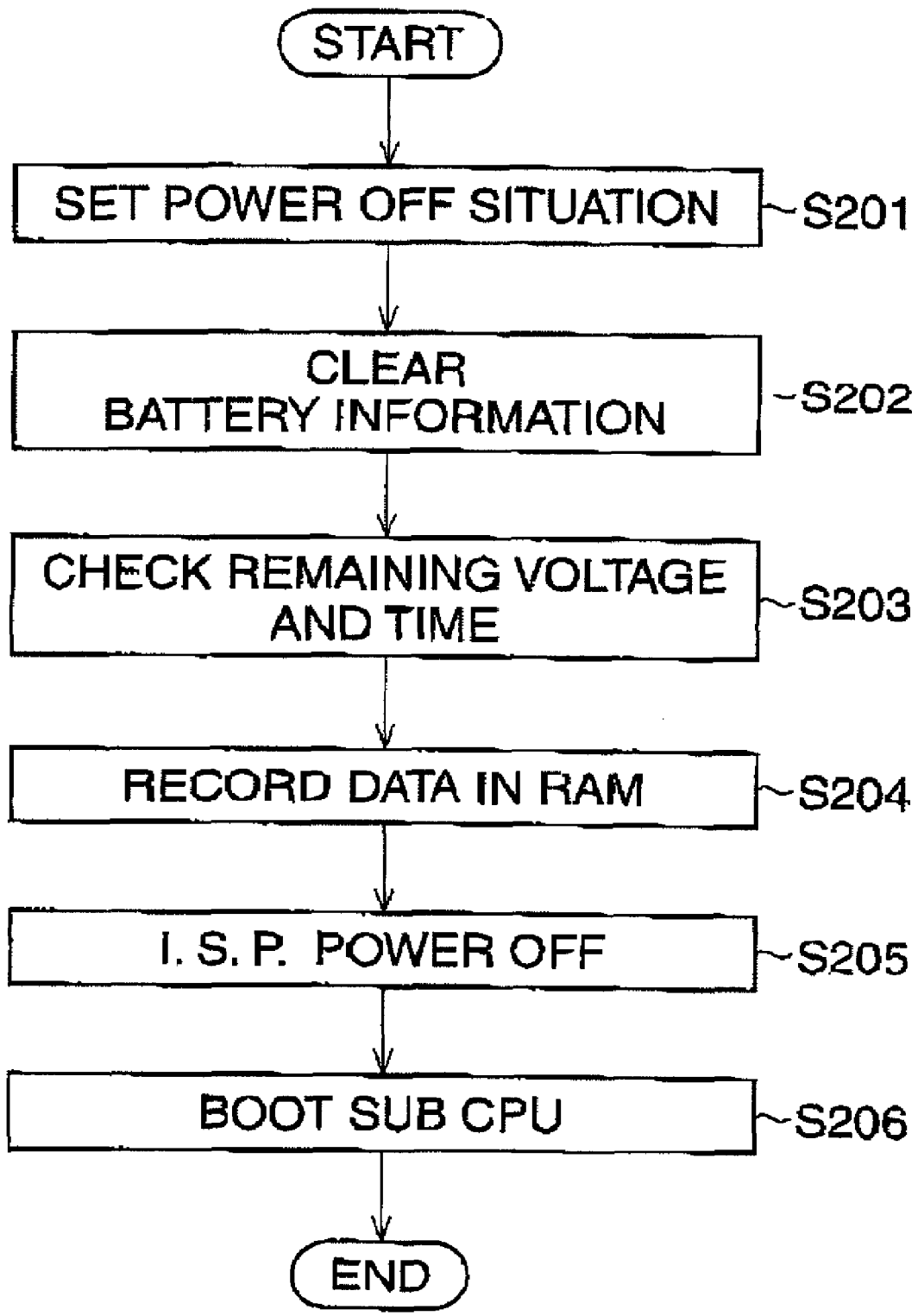
FIG. 5 is a subroutine of Step S113 shown in FIG. 3B.

FIG. 5 is a flowchart showing a subroutine of Step S113 (terminating process) shown in FIG. 32.

In Step S201, the iris 28A and the shutter 28B are driven such that the iris 28A and the shutter 28B return to a position corresponding to the electric power OFF state. In Step S202, data associated with the remaining voltage level of the battery 68 is reset. Then, in Step S203, the actual remaining voltage level of the battery 68 is detected and the present or real time is detected (in FIG. 4, the time is represented by "$t_1$"). In Step S204, the detected remaining voltage level and the real time are stored in the RAM 50D.

In Step S205, the image signal processor 46 is set to a sleep mode, namely, set as for the electric power OFF state. Then, in Step S206, a process for booting the sub CPU BOB is carried out, whereas the main CPU BOA is set to a sleep mode.

Figure 6:
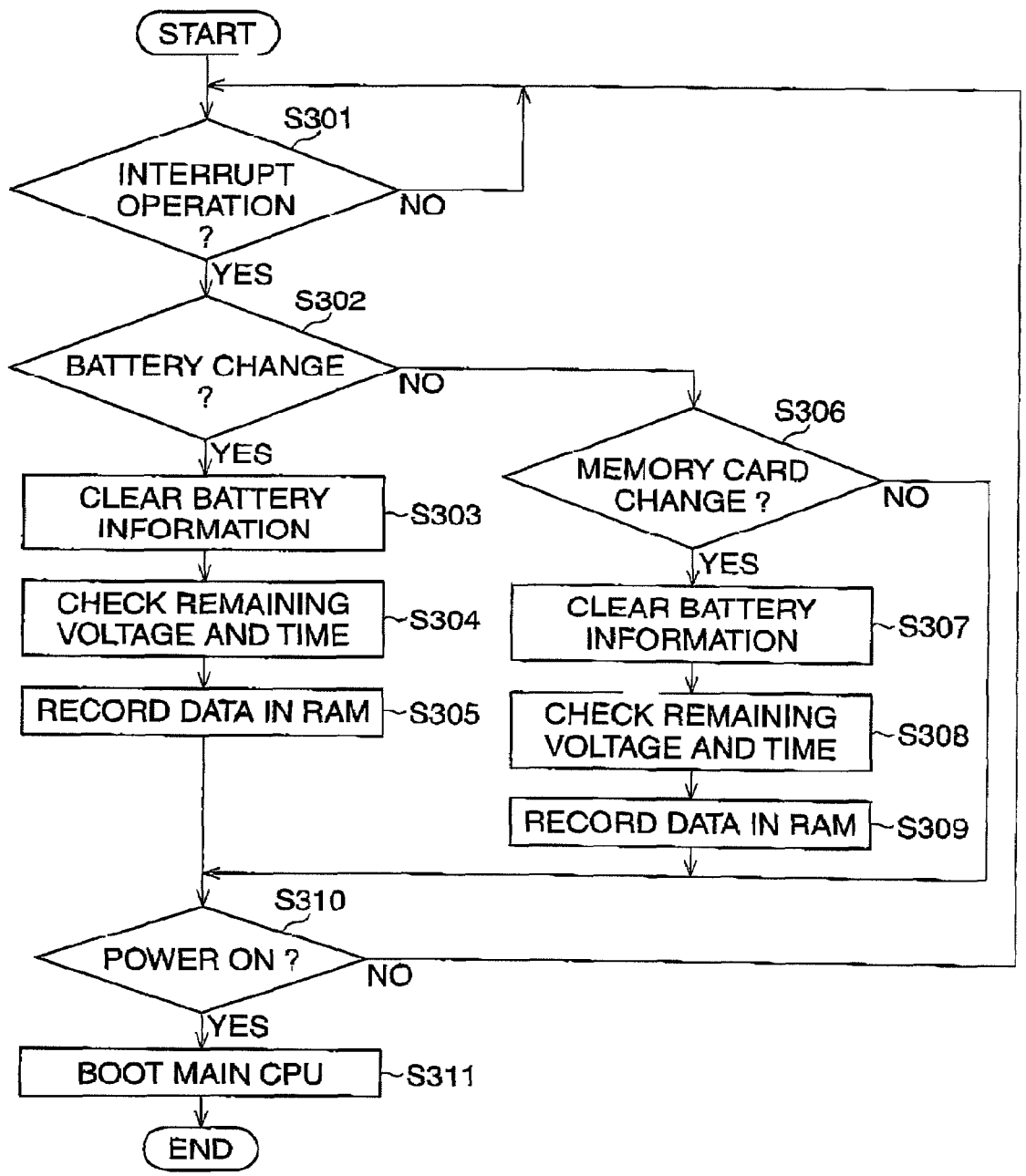
FIG. 6 is a flowchart showing the control process that is performed by the sub CPU.

FIG. 6 is a flowchart showing a control process that is performed by the sub CPU 50B while the camera 10 is in the electric power OFF state.

In Step S301, it is determined whether an interrupt operation is performed while the camera 10 is in the electric power OFF state. Herein, the interrupt operation indicates an operation of the power button 15 to turn the power on, an exchange operation of the battery 68, or an exchange operation of the memory card 60. The sub CPU 50 detects an attachment or removal of the battery 68 or the memory card 60 through a sensor which is provided on a battery case (not shown). If it is determined that the interrupt operation is not performed, the process of Step S301 is repeatedly carried out. On the other hand, if it is determined that the interrupt operation is performed, the process goes to Step S302, in which it is determined whether an operation for exchanging the battery 68 is performed by the user. Herein, the exchange or the battery 68 is confirmed by detecting a hardware reset process of the camera 10 due to the battery exchange.

If it is determined that an operation to exchange the battery 60 is performed, the process moves to Step S303. The processes of Step S303 to S305 are substantially the same as those of Step S202 to S204 shown in FIG. 5. Namely, the remaining voltage level of the newly installed battery and the time of the installation are detected, and then recorded in the RAM SOD. After Step S305 is performed, the process moves to Step S310.

On the other hand, if it is determined that the operation to exchange the battery 68 is not performed, the process moves to Step S306, in which it is determined whether a process to exchange the memory card 60 is performed. If it is determined that a process to exchange the memory card 60 is not performed, the process moves to Step S310. On the other hand, if it is determined that the process to exchange the memory card 60 is performed, the process moves to Step S307.

The processes of Steps S307 to S309 are the same as those of Steps S303 to S305. Namely, a remaining voltage value is detected in the case that a new memory card is installed, and the time or installation is detected. Then, the detected remaining voltage level and time are recorded into the RAM 50D. After Step S309 is performed, the process moves to Step S310.

In Step S310, it is determined whether the camera 10 has been turned on by depressing the power button 15. If it is determined that the power button 15 has not been depressed, the process returns to Step S301. On the other hand, if it is determined that the power button 15 has been depressed, the process moves to Step S311, in which the sub CPU 50B is set to a sleep mode, and the main CPU 50A boots up from its sleep mode.

In this way, in the present embodiment, when the main electric power is turned off by depressing the power button 15, the remaining voltage level (Vf) of the battery 68 and the time ($t_1$) are detected. Then, this voltage level and time are stored in the RAM SOD (Steps S203 and S204). When the camera 10 is subsequently turned on by depressing the power button 15, the time ($t_2$) and the temperature (T) are detected (Steps S101 and S102), and the elapsed time ($\Delta t$) that is the time period from the last electric power OFF to the current power ON is calculated (Step S103). Then, based on the voltage level detected when the camera 10 was last turned off, the elapsed time "$\Delta t$", and the discharge curve corresponding to the detected temperature, the estimated remaining voltage value is calculated (S104). Since the discharge characteristic of the battery 68 is represented an a function of voltage and time as shown in FIG. 4, the remaining battery level is exactly obtained.

Subsequently, when the estimated remaining voltage level is larger than the limited voltage value "V1", the boot or starting process is carried out (Steps S109 to S111). Since the remaining battery level immediately after the electric power is turned on is known exactly, without an actual detection of the remaining battery level, so users can photograph and capture a subject quickly after the camera 10 is turned on.

Further, when the estimated remaining voltage value is not larger than the limited voltage value "V1", the remaining voltage value is actually detected (Step S106), and so can be confirmed whether the camera 10 absolutely cannot be started up.

Also, in the present invention, when the battery or the memory card is changed while the electric power is off, the remaining battery level and time are detected (Steps S304 and S308). Therefore, new information associated with the remaining voltage level is recorded, and an exact remaining voltage level when the camera is turned on is calculated.

Note that, when the camera is turned on, a program necessary for driving the photographing optical system and the CCD may be first read from the ROM, and, next, a program for acquiring information regarding the memory card 60 may be read.

As for mobile electronic equipment with a photographing function; a video camera, a film-based still camera, or a cellular phone may be utilized instead of a digital camera. The remaining voltage level necessary for booting the camera (limited voltage level) may be set in accordance with the environment or condition in which the camera is used.

Finally, it will be understood by those skilled in the arts that the foregoing description is of preferred embodiments of the device, and that various change and modifications may be made to the present invention without departing from the spirit and scope thereof.

The present disclosure relates to subject matter contained in Japanese Patent Application No. 2006-219285 (filed on Aug. 11, 2006), which is expressly incorporated herein by reference, in its entirety.

The invention claimed is:

1. A digital camera comprising:
    a battery configured to supply electric power;
    a battery level detector that detects a remaining voltage level of said battery when said digital camera is turned OFF, by detecting an actual remaining voltage level of the battery;
    a time detector that detects an elapsed time from an electric power OFF operation to an electric power ON operation, when said digital camera is turned ON;
    a remaining voltage calculator that calculates a remaining voltage level of said battery on the basis of the detected elapsed time, the detected remaining voltage level, and a discharge characteristic of said battery, when said digital camera is turned ON; and
    a boot controller that determines whether the calculated remaining voltage level is larger than a limited voltage necessary to boot the digital camera, and allows the digital camera to boot by performing a boot process when the calculated voltage level is greater than the limited voltage, and when the calculated remaining voltage level is determined to not be larger than the limited voltage, the battery level detector detects an actual remaining voltage level of the battery, and said boot controller determines whether the detected remaining voltage level is larger than the limited voltage and allows said digital camera to boot, by performing a boot process, when said boot controller determines that the detected remaining voltage level is larger than the limited voltage.

2. The digital camera of claim 1, wherein the boot process includes at least one of; an initial driving of an image sensor, an initial driving of a photographing optical system, an initial driving of a signal processing circuit, and an initial driving of a display.

3. The digital camera of claim 2, wherein the boot process includes a process for acquiring information associated with a medium that is removably attached to said camera and stores image data.

4. The digital camera of claim 1, wherein said time detector comprises a timer that detects a time regardless of whether the electric power is ON or OFF.

5. The digital camera of claim 1, further comprising a temperature detector that detects a temperature of said digital camera when the camera is turned ON, said remaining voltage calculator calculating the remaining voltage level on the basis of a discharge characteristic that is represented by a curve in which a voltage level decreases with passage of time, and the curve varies in accordance with temperature.

6. The digital camera of claim 1, the battery level detector further detects the remaining voltage level of an exchanged battery when said battery is exchanged during the electric power OFF state, and said time detects an elapsed time from the battery exchange to the electric power ON operation.

7. The digital camera of claim 1, the battery level detector further detects the remaining voltage level of said battery when a medium is exchanged, said medium removably attached to said digital camera and storing image data, and said time detector detects an elapsed time from a medium exchange to an electric power ON operation.

8. The digital camera according to claim 1, the limited voltage being the same when the boot controller determines whether the calculated remaining voltage level is adequate to boot the camera and when the boot controller determines whether the detected remaining voltage level is adequate to boot the camera.

9. An apparatus for starting a mobile electronic equipment with a photographing function, the apparatus comprising:
- a battery level detector that detects a remaining voltage level of a battery when said mobile electronic equipment is turned OFF, by detecting an actual remaining voltage level of the battery;
- a time detector that detects an elapsed time from an electric power OFF operation to an electric power ON operation, when said mobile electronic equipment is turned ON;
- a remaining voltage calculator that calculates a remaining voltage level of the battery provided in said mobile electronic equipment on the basis of the detected elapsed time, the detected remaining voltage level, and a discharge characteristic of said battery, when said mobile electronic equipment is turned ON; and
- a boot controller that determines whether the calculated remaining voltage level is larger than a limited voltage necessary to boot the mobile electronic equipment, and allows the mobile electronic equipment to boot by performing a boot process when the calculated voltage level is greater than the limited voltage, and when the calculated remaining voltage level is determined to not be larger than the limited voltage, the battery level detector detects an actual remaining voltage level of the battery, and said boot controller determines whether the detected remaining voltage level is larger than the limited voltage and allows said mobile electronic equipment to boot, by performing a boot process, when said boot controller determines that the detected remaining voltage level is larger than the limited voltage.

10. The apparatus for starting a mobile electronic equipment of claim 9, wherein the boot process includes at least one of an initial driving of an image sensor, an initial driving of a photographing optical system, an initial driving of a signal processing circuit, and an initial driving of a display.

11. The apparatus for starting a mobile electronic equipment of claim 9, further comprising a temperature detector that detects a temperature of said mobile electronic equipment when the mobile electronic equipment is turned ON, said remaining voltage calculator calculating the remaining voltage level on the basis of a discharge characteristic that is represented by a curve in which a voltage level decreases with passage of time, and the curve varies in accordance with temperature.

12. The apparatus for starting a mobile electronic equipment according to claim 9, the limited voltage being the same when the boot controller determines whether the calculated remaining voltage level is adequate to boot the mobile electronic equipment and when the boot controller determines whether the detected remaining voltage level is adequate to boot the mobile electronic equipment.

13. A non-transitory computer readable medium computer readable medium that stores a program for starting a mobile electronic equipment, comprising:
- a battery level detection code segment that detects a remaining voltage level of a battery when said mobile electronic equipment is turned OFF, by detecting an actual remaining voltage level of the battery;
- a time detection code segment that detects an elapsed time from an electric power OFF operation to an electric power ON operation, when said mobile electronic equipment is turned ON;
- a remaining voltage calculation code segment that calculates a remaining voltage level of the battery provided in said mobile electronic equipment on the basis of the detected elapsed time, the detected remaining voltage level, and a discharge characteristic of said battery, when said mobile electronic equipment is turned ON; and
- a boot control code segment that determines whether the calculated remaining voltage level is larger than a limited voltage necessary to boot the mobile electronic equipment, and allows the mobile electronic equipment to boot by performing a boot process when the calculated voltage level is greater than the limited voltage, and when the calculated remaining voltage level is determined to not be larger than the limited voltage, the battery level detection code segment detects an actual remaining voltage level of the battery, and said boot control code segment determines whether the detected remaining voltage level is larger than the limited voltage and allows said mobile electronic equipment to boot, by performing a boot process, when the boot control code segment determines that the detected remaining voltage level is larger than the limited voltage.

14. The non-transitory computer readable medium computer readable medium according to claim 13, wherein the boot process includes at least one of an initial driving of an image sensor, an initial driving of a photographing optical system, an initial driving of a signal processing circuit, and an initial driving of a display.

15. The non-transitory computer readable medium computer readable medium according to claim 13, further comprising a temperature detection code segment that detects a temperature of the mobile electronic equipment when the mobile electronic equipment is turned ON, the remaining voltage calculation code segment calculating the remaining voltage level on the basis of a discharge characteristic that is represented by a curve in which a voltage level decreases with passage of time, and the curve varies in accordance with temperature.

16. The non-transitory computer readable medium computer readable medium according to claim 13, the limited voltage being the same when the boot control code segment determines whether the calculated remaining voltage level is adequate to boot the mobile electronic equipment and when the boot control code segment determines whether the detected remaining voltage level is adequate to boot the mobile electronic equipment.

17. A method for starting a mobile electronic equipment with a photographing function, the method comprising:
- detecting a remaining voltage level of a battery when the mobile electronic equipment is turned OFF, by detecting an actual remaining voltage level of the battery;
- detecting an elapsed time from an electric power OFF operation to an electric power ON operation, when the mobile electronic equipment is turned ON;
- calculating a remaining voltage level of a battery provided in the mobile electronic equipment on the basis of the detected elapsed time, a last remaining voltage level that was detected when the mobile electronic equipment was turned OFF, and a discharge characteristic of the battery, when the mobile electronic equipment is turned ON;
- determining whether the calculated remaining voltage level is larger than a limited voltage necessary to boot the mobile electronic equipment and allowing the mobile electronic equipment to boot by performing a boot process when the calculated voltage level is greater than the limited voltage, and when the calculated remaining voltage level is determined to not be larger than the limited voltage, the detecting remaining voltage level detects an actual remaining voltage level of the battery and determines whether the detected remaining voltage level is larger than the limited voltage; and allowing the mobile electronic equipment to boot, by performing a boot process, upon a determination that the detected remaining voltage level is larger than the limited voltage.

18. The method according to claim 17, wherein the boot process includes at least one of an initial driving of an image sensor, an initial driving of a photographing optical system, an initial driving of a signal processing circuit, and an initial driving of a display.

19. The method according to claim 17, further comprising detecting a temperature of the mobile electronic equipment when the mobile electronic equipment is turned ON, the calculating of the remaining voltage level calculating the remaining voltage level on the basis of a discharge characteristic that is represented by a curve in which a voltage level decreases with passage of time, and the curve varies in accordance with temperature.

20. The method for starting a mobile electronic equipment according to claim 17, the limited voltage being the same when the determining determines whether the calculated remaining voltage level is adequate to boot the mobile electronic equipment and when the determining determines whether the detected remaining voltage level is adequate to boot the mobile electronic equipment.

\* \* \* \* \*